United States Patent
McDougald et al.

(10) Patent No.: US 7,045,103 B2
(45) Date of Patent: *May 16, 2006

(54) MULTIPHASE MIXING DEVICE WITH BAFFLES

(75) Inventors: Neil K. McDougald, Tracy, CA (US); Sherri L. Boyd, Robbinsville, NJ (US); Gregory P. Muldowney, Glen Mills, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 446 days.

This patent is subject to a terminal disclaimer.

(21) Appl. No.: 10/341,123

(22) Filed: Jan. 13, 2003

(65) Prior Publication Data

US 2004/0136886 A1 Jul. 15, 2004

(51) Int. Cl.
*B01J 10/00* (2006.01)
*B01J 8/02* (2006.01)

(52) U.S. Cl. ............... 422/191; 422/194; 422/195; 422/220; 422/224; 239/558; 261/179

(58) Field of Classification Search ........... 422/191, 422/194, 195, 220, 224; 239/558; 261/179
See application file for complete search history.

(56) References Cited

U.S. PATENT DOCUMENTS

| | | | |
|---|---|---|---|
| 3,787,189 A | | 1/1974 | Muffat et al. |
| 4,836,989 A | * | 6/1989 | Aly et al. ................ 422/195 |
| 4,960,571 A | * | 10/1990 | Bhagat et al. ............ 422/194 |
| 5,152,967 A | * | 10/1992 | Rossetti et al. .......... 422/194 |
| 5,403,560 A | * | 4/1995 | Deshpande et al. ...... 422/190 |
| 5,462,719 A | * | 10/1995 | Pedersen et al. ......... 422/195 |
| 5,554,346 A | * | 9/1996 | Perry et al. .............. 422/195 |
| 5,567,396 A | * | 10/1996 | Perry et al. .............. 422/190 |
| 5,635,145 A | * | 6/1997 | Den Hartog et al. ..... 422/191 |
| 5,690,896 A | * | 11/1997 | Stangeland et al. ...... 422/191 |
| 5,837,208 A | * | 11/1998 | Grott et al. .............. 422/195 |
| 5,935,413 A | * | 8/1999 | Boyd et al. ................. 208/49 |
| 6,180,068 B1 | * | 1/2001 | Boyd et al. .............. 422/195 |
| 6,186,658 B1 | | 2/2001 | Nishida et al. |
| 2002/0172632 A1 | * | 11/2002 | Chou ....................... 422/220 |
| 2004/0037759 A1 | | 2/2004 | VanVliet et al. |

FOREIGN PATENT DOCUMENTS

| | | |
|---|---|---|
| EP | 0 462 753 A1 | 12/1991 |
| EP | 0 472 335 A1 | 2/1992 |
| EP | 0 663 236 A1 | 7/1995 |
| EP | 0 716 881 A1 | 6/1996 |

OTHER PUBLICATIONS

Co-pending application entitled. "Improved Multiphase Mixing Device with Staged Gas Introduction" (U.S. Appl. No. 10/358,760, filed on Feb. 5, 2003.

* cited by examiner

*Primary Examiner*—N. Bhat
(74) *Attorney, Agent, or Firm*—Glenn T. Barrett

(57) ABSTRACT

The present invention provides a novel means to provide more effective mixing of quench gas and process fluids in a height constrained interbed space of a catalytic reactor without increasing pressure drop. In particular, the device improves the effectiveness of an existing mixing volume in mixing the gas phase of two-phase systems. According to the present invention, the quench zone hardware contained within the reactor includes a substantially vertical continuous perimeter solid baffle attached to the underside of the collection tray.

12 Claims, 4 Drawing Sheets

MULTIPHASE MIXING DEVICE WITH BAFFLES

FIELD OF THE INVENTION

The present invention relates generally to systems for mixing process gases and liquids and more specifically to interbed quench and mixing systems involving cocurrent downflow reactors using fixed hardware.

BACKGROUND OF THE INVENTION

In fixed-bed fuels and lube hydroprocessing units, gas and liquid flow downward through multiple beds of solid catalyst. Heat is released from the catalytic reactions causing temperature to increase with distance down the bed. Cool hydrogen-rich gas is introduced between the beds to quench the temperature rise and replenish the hydrogen consumed by the reactions. Three requirements of an effective quench zone are transverse gas mixing, transverse liquid mixing, and quench gas mixing.

The introduction and mixing of quench into the process gas and liquid must be carried out in the interbed space which spans the full vessel diameter, but is often shorter than one vessel radius. Support beams, piping and other obstructions also occupy the interbed region so that unique hardware is required to perform efficient two-phase mixing in what amounts to limited volume.

Poor quench zone performance manifests itself in two ways. First, the quench zone fails to erase lateral temperature differences at the outlet of the preceding bed or, in the worst cases, amplifies them. An effective quench zone should be able to accept process fluids with 50 to 75 degree F. lateral temperature differences or higher and homogenize them sufficiently that differences do not exceed 5 degree F. at the following bed inlet. The second sign of poor performance is that inlet temperature differences following the quench zone increase as the rate of quench gas is raised. This indicates inadequate mixing of cooler gas with the hot process fluids.

Poor quench zone performance limits reactor operation in various ways. When interbed mixing is unable to erase temperature differences, these persist or grow as the process fluids move down the reactor. Hot spots in any bed lead to rapid deactivation of the catalyst in that region which shortens the total reactor cycle length. Product selectivities are typically poorer at high temperatures; hot regions can cause color, viscosity and other qualities to be off-specification. Also, if the temperature at any point exceeds a certain value (typically 800 to 850. degree F.), the exothermic reactions may become self-accelerating leading to a runaway which can damage the catalyst, the vessel, or downstream equipment. Cognizant of these hazards, refiners operating with poor internal hardware must sacrifice yield or throughput to avoid these temperature limitations. With present day refinery economics dictating that hydroprocessing units operate at feed rates far exceeding design, optimum quench zone design is a valuable low-cost debottleneck.

In U.S. Pat. No. 4,836,989 is described a method for quench zone design. The essential feature of this design is the rotational flow created in the mixing volume which increases fluid residence time and provides repeated contacting of liquid and gas from different sides of the reactor. This design is keyed to liquid mixing. More recent studies have shown it to be only a fair gas mixer. The trend to higher conversion and higher hydrogen circulation in fuels refining translates to gas/liquid ratios for which this design is not well suited. Height constrained units cannot be fitted with mixing chambers of the type described in this patent that are deep enough to effectively mix both the gas and liquid phases.

An interbed mixing system described in U.S. Pat. No. 5,462,719 offers some improvements over the design described above when gas mixing is paramount. This hardware is based again on a swirl chamber, but also includes at least three highly restrictive flow elements to enhance mixing, which necessarily increase pressure drop. Like the previously described system, this quench zone mixes the gas and liquid at once in a single chamber.

Another system, which is disclosed in U.S. Pat. No. 6,180,068, also provides enhanced mixing of quench gas and process fluids within the interbed space. This system employs separate mixing zones for each of two reactants permitting flexibility in mixing conditions while minimizing pressure drop as well as space and volume requirements. However, the efficiency of this device is sensitive to the degree of phase segregation achieved at the interbed inlet and thus may not perform as desired under all conditions and with respect to particular reactant characteristics.

SUMMARY OF THE INVENTION

The present invention provides a novel means to provide more effective mixing of quench gas and process fluids in a height constrained interbed space while not increasing pressure drop. In particular, the device improves the effectiveness of an existing mixing volume in mixing the gas phase of two-phase systems.

According to the present invention, the quench zone hardware contained within the reactor includes a substantially vertical continuous perimeter solid baffle attached to the collection tray.

In a preferred embodiment of the present invention, the diameter of the baffle is greater than the diameter of the mixing chamber outlet which is defined by the rim of the mixing chamber and smaller than the diameter defined by the inlets to the mixing volume.

Another aspect of the present invention provides improvement in connection with gas phase mixing by providing an incremental increase in the volume available for gas mixing by increasing the ceiling height of the mixing volume within the diameter of the baffle. This increase is accomplished through a cap structure which protrudes above the collection tray.

DETAILED DESCRIPTION OF THE INVENTION

Figure 1:
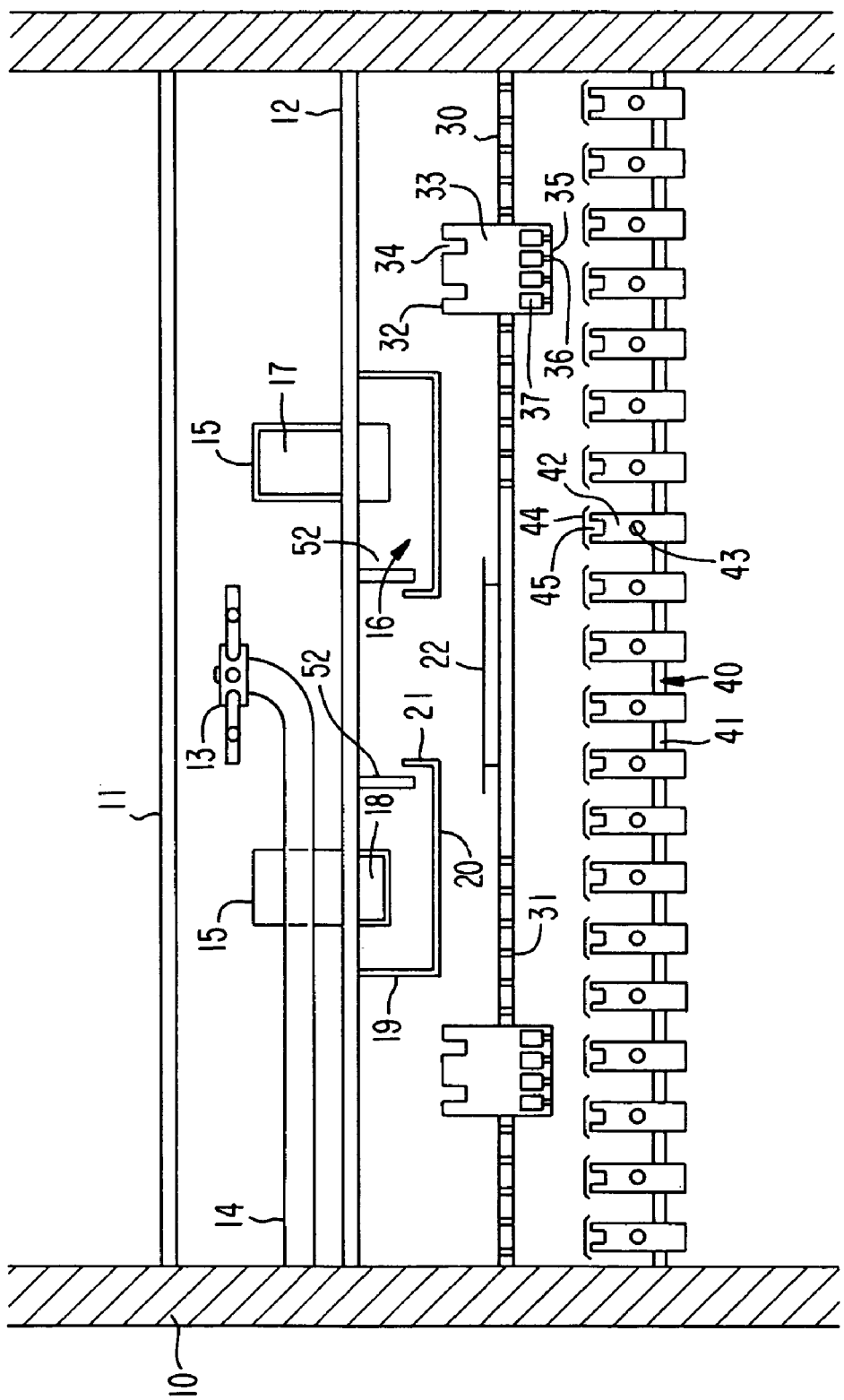
FIG. 1 is a vertical section of a portion of a multiple bed reactor showing the distribution system of the present invention.

FIG. 1 shows, in simplified form, a section through the portion of a multiple bed, downflow reactor in the region between the beds. The general configuration of the downflow reactor is conventional, as are details such as the supports for the grids and distributor plates which are not shown for purposes of clarity. The walls 10 of the reactor and the catalyst support grid 11 support an upper bed of catalyst or other particulate solid over which the liquid is to flow together with any vapor included as the reactant or as a product of the reaction. For clarity, the catalyst is not shown. The support grid may be of conventional type and provides support for the catalyst either directly or by means of support balls which permit the liquid and vapor to flow downwardly out of the upper bed of catalyst and through the grid to the distributor system beneath. A collection tray 12 is disposed beneath the catalyst support grid 11 to collect the liquid leaving the upper catalyst bed. The vapor injection point is provided here by means of a horizontally disposed sparger having multiple radial arms and commonly known as a spider. Spider 13 which is connected to vapor injection line 14 provides a uniform initial distribution of the injected vapor. For example, in a hydroprocessing reactor such as a catalytic hydrodesulfurization (CHD) unit, hydrogen may be injected as quench at this point. Other vapor injection devices may also be used, and if desired, vapor takeoff may also be provided at this level. For example a horizontal ring extending outward toward the vessel walls 10 may be used such that quench flow is directed toward the center of the reactor. Another example of a vapor injection device that could be used is a horizontal pipe with two exits such as may be formed in a "T" shape.

A plurality of spillways 15 are provided in collector tray 12 to permit a pool of liquid to accumulate on tray 12 before passing through the spillways into mixing chamber 16 beneath. The spillways comprise upstanding downcomers which provide a passage 17 for the downflowing liquid as well as for the vapor. The spillways have outlets 18 beneath collector tray 12 which face sideways and tangentially into an annular mixing chamber 16. Mixing chamber 16 comprises a cylindrical, vertical wall portion 19 which is fixed to collection tray 12 and a lower, annular tray 20 with an upstanding rim 21 for providing a pool of liquid in the mixing chamber. The side facing outlets 18 of spillways 15 impart a rotary or swirling motion to liquid in mixing chamber 16 which promotes good intermixing and temperature equilibrium of the liquid at this point. The liquid spills over the edge or rim 21 and falls downwards onto the deflector 22 which is disposed directly underneath the central aperture in the annular mixing chamber 16.

Figure 2:
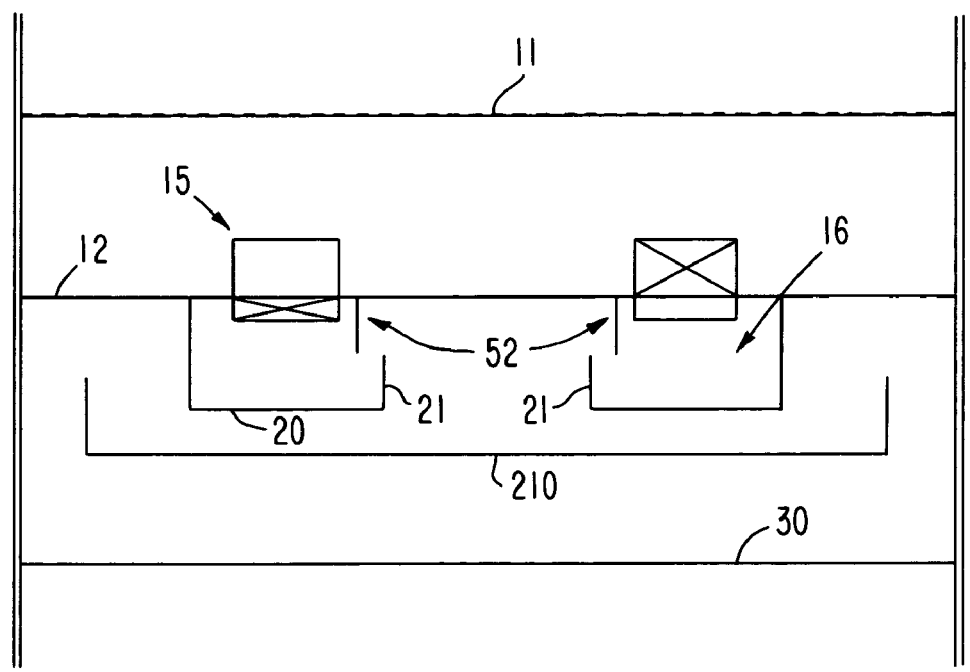
FIG. 2 is a vertical section of a multiple bed reactor, similar to FIG. 1 but further simplified.

According to the teachings of the present invention and as further illustrated in FIG. 1 and FIG. 2, at least one baffle 52 comprising a substantially vertical continuous perimeter solid extrusion is attached to the underside of collection tray 12. In a preferred embodiment of the present invention, the diameter of baffle 52 is greater than the diameter of the mixing chamber rim 21 and smaller than the diameter defined by the spillway outlets 18. As can be seen from the Figures, it is preferable that baffle 52 be of a sizing and positioning such that it is located completely inside the diameter defined by spillways 15 and completely outside the diameter defined by rim 21 of mixing chamber 16.

It will be noted that although FIG. 1 shows a deflector 22 for receiving spillover of the liquid, FIG. 2 illustrates an alternative embodiment in which flash pan 210 is substituted for deflector 22. In the FIG. 2 embodiment, flash pan 210 acts in a manner similar to deflector 22 in that it acts to reduce the momentum of the fluids exiting the mixing section prior to conveyance to distributor tray 30. An additional, final distributor tray such as the final distributor tray 40 in FIG. 1 may be employed although it is not shown in the FIG. 2 embodiment.

The present invention provides at least three beneficial features with respect to mixing performance within the downflow reactor. First, baffle 52 of the present invention prevents short circuiting of the gas through the mixing volume thus promoting repeated contact between the gas and the liquid from different regions within the reactor. Second, baffle 52 forces the liquid level in mixing chamber 16 down thus creating an outer annular region for the rotational flow of the two-phase mixture. Third, baffle 52 isolates a principally gas-filled region inside baffle 52 above the outlet of mixing chamber 16 thus promoting mixing in the gas phase.

Figure 3:
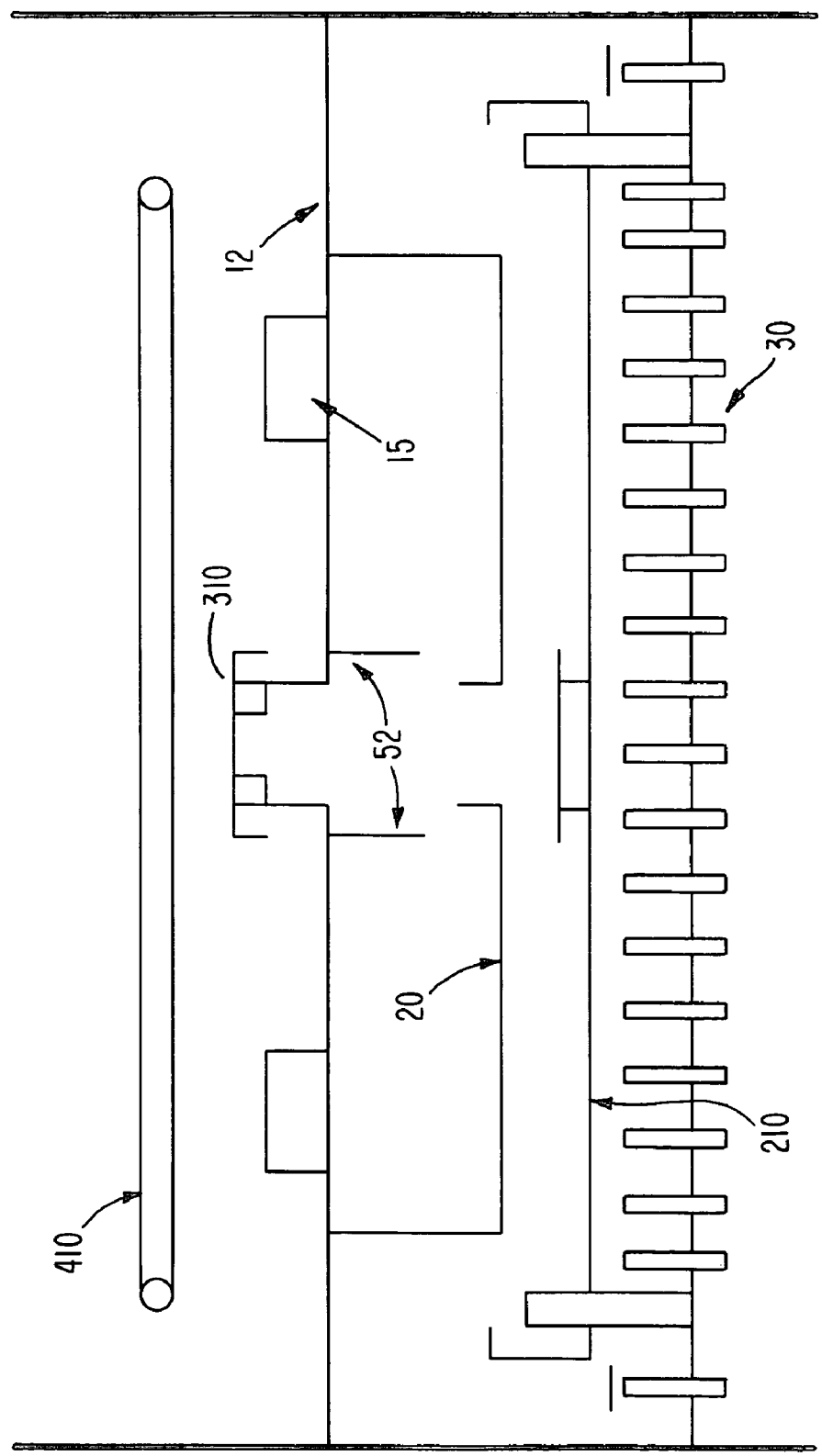
FIG. 3 is an elevation view which depicts the vapor-liquid mixing system of the present invention and which includes the novel cap structure described herein.

FIG. 3 illustrates another aspect of the present invention which offers improvement in connection with gas phase mixing by providing an incremental increase in the volume available for gas mixing by increasing the ceiling height of the mixing volume within the diameter of baffle 52. This increase is accomplished through cap structure 310 which protrudes above collection tray 12. Cap structure 310 extends above collection tray 12 and may be integrally formed as a component thereof. Cap structure 310 is positioned to cover the central opening in collection tray 12 and thus has a diameter equal to or greater than the central opening. In a preferred embodiment, cap structure 310 has a height less than the distance between collection tray 12 and ring sparger 410 and may be ½ to ⅓ of that distance.

Figure 4:
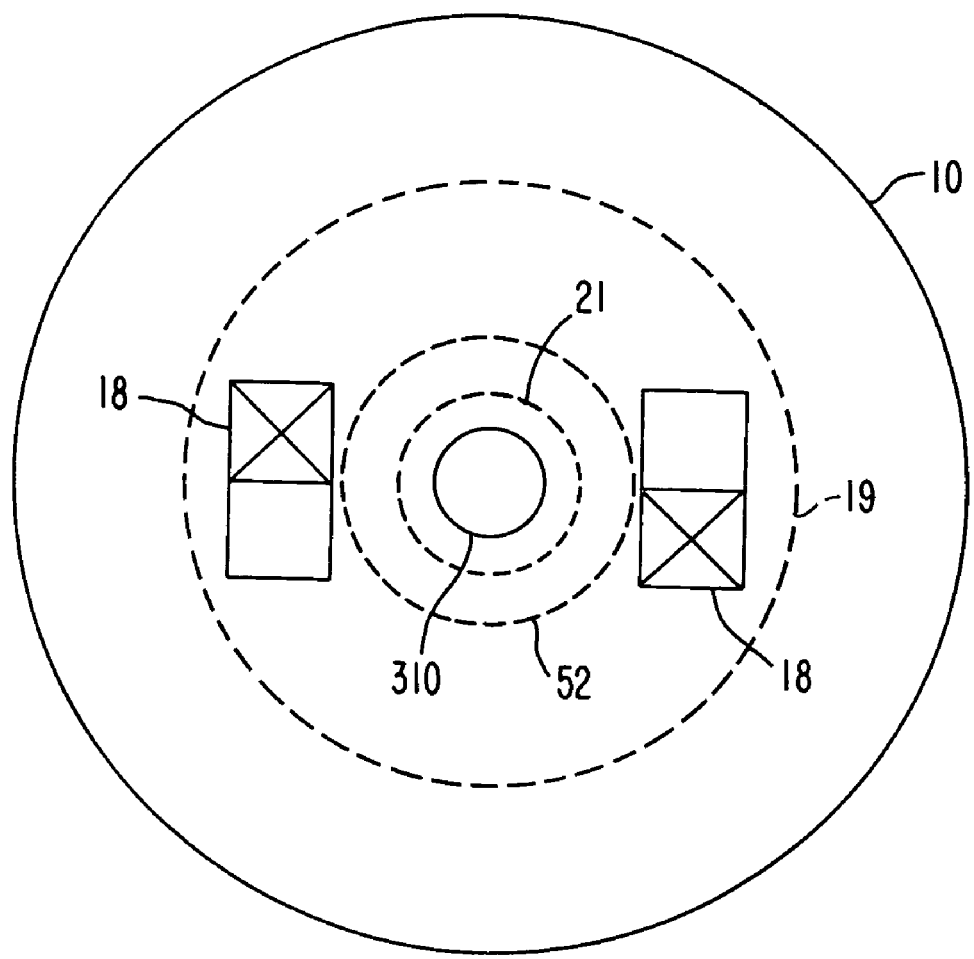
FIG. 4 is a plan view of a multiple bed reactor of the present invention including a cap protruding upwards from the collection tray.

FIG. 4 is a plan view of a multiple bed reactor of the present invention showing the raised cap 310 protruding upwards from the collection tray 12. As can be seen, baffle 52 comprises a circular extrusion centered within the reactor and internal to mixing chamber 16 and has a diameter which is larger than that of rim 21 but smaller than that defined by the position of spillway outlets 18.

In connection with the description herein, FIG. 1 shows much of the detail of the reactor which is not shown in the other figures. Additional description with respect to this detail is now provided in connection with FIG. 1. In the case of the FIG. 1/FIG. 2 embodiment and as also applicable to the FIG. 3/FIG. 4 embodiment discussed above although not shown, deflector 22 is fixed to the first, rough distributor tray 30 which provides an initial, rough distribution of the liquid and the vapor across the reactor. The first distributor tray 30 is provided with a large number of liquid downflow apertures 31 in the region about central deflector 22. Generally, a pool of liquid will accumulate on tray 20 and cover these apertures so that flow of vapor through them is precluded. To provide for vapor flow into the lower portion of the reactor, a plurality of vapor chimneys 32 may be provided, arranged in a ring around the tray, suitably at a point near the circumference of a circle which divides the reactor flow area equally in two. The number of vapor chimneys will be selected according to the desired flow rates and other conditions, as is conventional. The vapor chimneys each comprise an open-topped, imperforate upstanding tube 33 which extends upwardly from the first distributor tray 30. Around the top of each chimney tube a number of slots 34 are provided to act as weirs for liquid flow if the level of liquid on tray 30 should build up to the point where it is necessary to provide for additional flow through the tray to prevent flooding. The slots 34 may be of any desired configuration, for example, straight-sided, straight-bottomed slots as shown or they may alternatively be arcuate or apertures may be formed just below the top of the chimneys in order to provide for controlled liquid overflow down the chimneys. In order to ensure that any liquid flowing down the chimneys is evenly distributed, the chimneys preferably have distributor plates at their lower ends below tray 30 formed by plates 35 with liquid apertures 36 formed in them. To permit vapor flow out of the chimneys vapor outlets 37 are provided around the lower end of the chimneys and if large amounts of liquid flow down the chimneys, these outlets will permit liquid flow through them.

The second and final distributor tray 40 comprises a flat plate 41 with a large number of vapor/liquid downcomers to provide many points of distribution of vapor and liquid over the bed of catalyst below (not shown). Each downcomer comprises an upstanding tube 42 which extends upwardly from plate 41. Each tube has an aperture 43 (or apertures) in its side which is positioned below the top of the pool of liquid which forms on plate 41 during normal operation. The number and size of all the apertures in the downcomer are selected according to the desired flow rate and generally, it is preferred for the apertures to be totally submerged so that the greatest uniformity of liquid flow is achieved, regardless of variations in the level of the second distributor plate.

space in the reactor, as compared to other distribution systems which may provide a similar degree of distribution uniformity. The separate vapor and liquid distribution which occurs on the first distribution plate avoids potential problems with two-phase distribution and only at the end of the distribution process is liquid injected into each vapor stream through the vapor/liquid downcomers on the final distribution tray. Furthermore, the system, as described above, is relatively insensitive to tolerance variations introduced during fabrication and provides superior uniformity of distribution and vapor/liquid contact during operation under varying conditions. This system may also be used without quench injection to provide improved liquid mixing and liquid and vapor redistribution in a long catalyst bed.

The following table illustrates the mixing performance of the mixing system of the present invention with the baffle and cap additions as compared to that of the prior art Spider-Vortex system at fixed operating conditions. The measurements were obtained by measuring tracer concentrations in the gas phase.

| Run | Description | ΔP Psi | Sample 1 | Sample 2 | Sample 3 | Sample 4 | Sample 5 | Sample 6 | Avg | Quench Mixing |
|---|---|---|---|---|---|---|---|---|---|---|
| 61 | Spider-Vortex | 4.3 | 46 | 22 | 76 | 16 | 64 | 12 | 41 | 72 |
| 74 | Spider-Vortex with Baffle | 4.1 | 46 | 50 | 94 | 55 | 60 | 47 | 60 | 89 |
| 79 | Spider-Vortex with Baffle and Cap | 4.1 | 59 | 50 | 87 | 60 | 74 | 50 | 66 | x |

As pointed out above, the rate of flow of liquid into each aperture varies in proportion to the square root of the height of liquid above the apertures so that the flow rate into the downcomers is relatively insensitive to variations in the level of the distributor plate 40. However, if the liquid level on this tray falls to the point where the apertures are partly uncovered, variations in the horizontal level of the tray will produce relatively greater variations in flow rate across the reactor. For this reason, operation with the apertures completely submerged is preferable. The downcomers are open at the top in order to permit vapor to enter and pass down into the lower catalyst bed but in order to prevent liquid from the first, rough distributor plate entering the downcomers directly and so providing an unpredictable variation from the design flow rate, baffles 44 are placed over the open tops of the downcomers. In addition, the downcomers have liquid weirs at the top in order to provide for additional liquid flow if the liquid level on the second tray should build up beyond its normal height. As with the vapor chimneys, the weirs may be in any convenient form but are suitably straightforward slotted weirs provided by slots 45. The bottoms of the downcomers are open to permit flow of vapor and liquid into the lower catalyst bed.

The distribution system of the present invention provides improved injection of quench gas or other vapor into the reactor, improved mixing of vapor, liquid and injected gas as well as improved distribution across the reactor. This system may also be used with liquid quench with an appropriate injection means in place of the spider. In addition, the system is relatively compact in form and takes up relatively little In connection with the testing as described in the above table, the reported mixing index is defined as 100 less the standard deviation of tracer concentration, expressed as a percentage of the mean concentration, from eight sample locations equally spaced around the perimeter of the vessel below mixing chamber 16. The different mixing indices reported correspond to different tracer injection locations upstream of the mixing volume. The average is weighted to reflect the fraction of the reactor cross-section represented by each injection location as determined by the geometry and symmetry of the volume above collection tray 12. The weights for injection locations 1 through 6 are 2, 2, 2.5, 4, 3 and 1 respectively. As can be seen, the improvement in gas phase and quench gas mixing when employing the teachings of the present invention is quite substantial.

The teachings of the present invention may be employed in any multi-bed catalytic reactor or contactor requiring intermittent mixing and/or quench of downward flowing gas and liquid phases particularly when taking advantage of rotational flow in a mixing volume. The invention is particularly beneficial in connection with units with very limited inter-bed height. Further, existing quench hardware may relatively easily be retrofitted with the baffle improvement discussed herein in to achieve the benefits described.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A distributor system for distributing vapor and liquid across a downflow reactor, comprising:
   a collection tray for receiving vapor and liquid;
   a mixing chamber positioned below the collection tray, wherein the mixing chamber having at least one outlet, wherein the at least one outlet being oriented to permit the downward passage of vapor and liquid from the mixing chamber;
   at least one spillway extending through the collection tray to permit the downward passage of vapor and liquid from above the collection tray into the mixing chamber; and
   at least one baffle connected to the collection tray and extending downwardly therefrom into the mixing chamber,
   wherein the at least one baffle is located between the at least one outlet and the at least one spillway, such that a baffle radius of the at least one baffle is greater than an outlet radius of the at least one outlet and the baffle radius being smaller than a distance between the at least one spillway and a center of the chamber.

2. The system according to claim 1 further comprising means for injecting a gas above the collection tray.

3. The system according to claim 1 wherein said system is located in between beds of a multi-bed reactor.

4. The system according to claim 1 further comprising a cap structure protruding above the collection tray, wherein the mixing chamber extending into the cap structure.

5. The system according to claim 4 wherein said cap structure extends at least ⅓ of the way towards a catalyst support grid positioned above said collector tray.

6. The system according to claim 1 wherein said mixing chamber is cylindrical.

7. The distributor system according to claim 1, wherein the at least one outlet includes a rim extending about the perimeter of the at least one outlet, wherein the rim extends into the mixing chamber.

8. The distributor system according to claim 7, wherein the at least one baffle is positioned between the rim and the at least one spillway.

9. The distributor system according to claim 1, further comprising a deflector positioned below the at least one opening.

10. The distributor system according to claim 1, further comprising a flash pan positioned below the mixing chamber.

11. The distributor system according to claim 10, further comprising a deflector positioned on the flash pan below the at least one opening.

12. The distributor system according to claim 4, wherein the cap structure having a cap structure radius, wherein the cap structure radius is less than the baffle radius.

* * * * *